Figure 2:
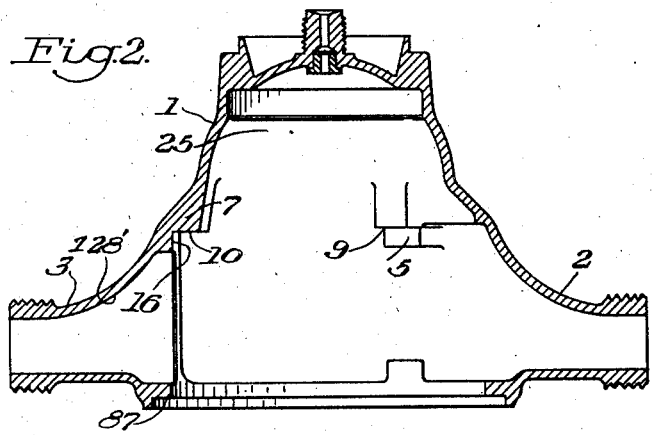

Sept. 3, 1946.   A. R. WHITTAKER   2,406,877
OSCILLATING DISK METER
Filed Nov. 27, 1943   3 Sheets-Sheet 1
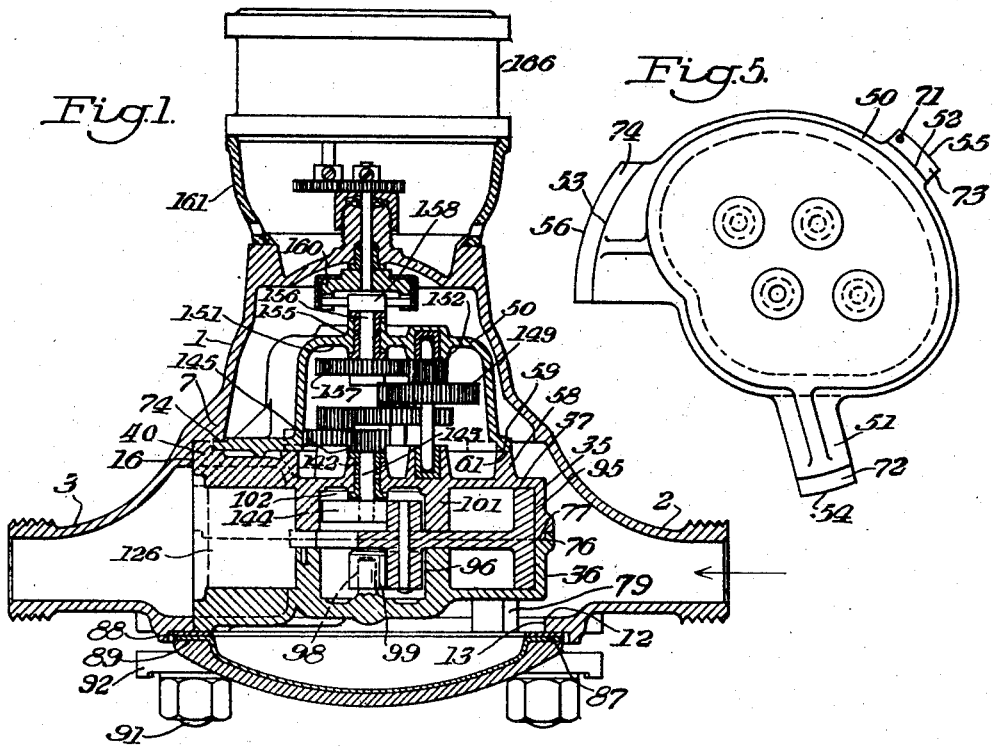
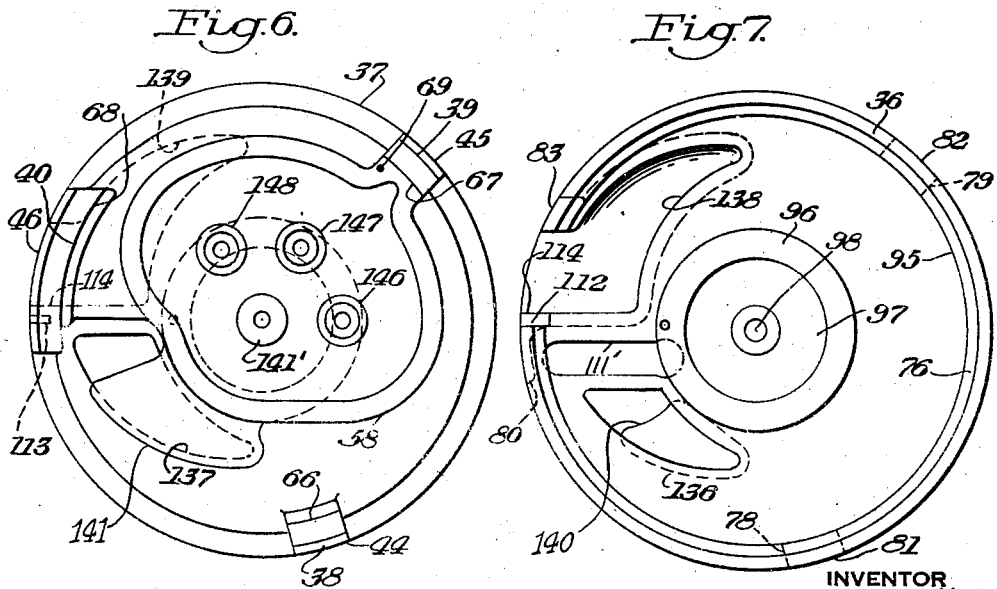
INVENTOR
Alexander R. Whittaker
BY
Lewis D. Koningsford
ATTORNEY Patented Sept. 3, 1946

2,406,877

UNITED STATES PATENT OFFICE 2,406,877

OSCILLATING DISK METER

Alexander R. Whittaker, New York, N. Y., assignor to Pittsburgh Equitable Meter Company, Pittsburgh, Pa., a corporation of Pennsylvania Application November 27, 1943, Serial No. 511,931

17 Claims. (Cl. 73—257)

The present invention relates to fluid meters, and particularly to those of the oscillating disk type.

This is a continuation-in-part of my co-pending application, Serial No. 420,407 filed November 25, 1941.

It is an object of the invention to provide a meter of this type having great accuracy over a wide range of flows.

It is a further object to reduce the pressure absorption in this type of meter.

A further object is to reduce the size of the measuring chamber while increasing the rate of flow therethrough.

Another object is the provision of a meter of this type in which internal pressure due to freezing of water in the meter will not damage the gearing, meter chamber, or other parts of the meter.

A further object is to provide a meter of this type in which a single means releasably holds the gear casing, measuring chamber and external housing in assembled position.

Another object is the provision of a combined gear case and measuring chamber.

Another object is the provision of a combined key and diaphragm to hold the measuring chamber in position.

Another object is to construct the measuring chamber so as to facilitate its manufacture.

In accordance with the present invention, I provide an oscillating disk meter having a slot in the housing adjacent to and parallel to the division plate, and a guide roller extends from the oscillating disk into the slot to guide the disk. The meter chamber is provided with double inlet openings which open into the interior of the meter chamber from the top and bottom thereof and thus reduce the pressure absorption of the meter. The inlet openings are located in the top and bottom walls on one side of the division plate or diaphragm, and outlet depressions are formed in the top and bottom walls which merge in the meter chamber on the other side of the division plate, an outlet passage being in communication therewith and sealed off from the annular inlet chamber. I prefer to provide shields for the inlet openings to prevent currents in the measuring compartments acting on the disk. The measuring chamber is positioned in the exterior housing by internal shoulders or stops which provide an annular space between the measuring chamber and housing walls communicating with the inlet openings, and co-operating sealing surfaces on the housing and measuring chamber surrounding the outlet separate the outlet from the inlet, thus compelling the fluid to be measured to pass through the measuring chamber. The bottom plate is held against the measuring chamber by pressure releasable means which prevents damage to the measuring chamber in case of freezing of the fluid within the meter. In the type of meter having an enclosed reduction gear, the gear chamber has means interposed between the measuring chamber and the housing stop lugs, whereby the bottom cover also serves to releasably hold the gear housing in place. This allows expansion of the measuring chamber away from the gear housing in case of freezing, and as the measuring chamber is divided, the two halves will also separate in case of freezing, thus preventing damage to the gearing, gear housing, measuring chamber or measuring disk. Preferably, the measuring chamber is divided at its middle to facilitate its manufacture.

Figure 3:
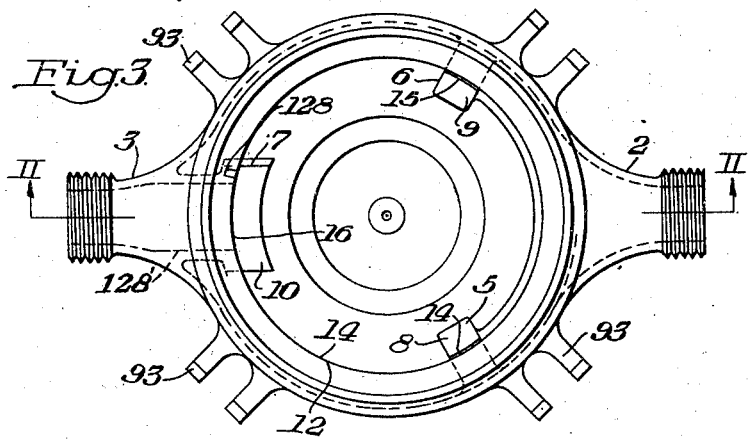
Figure 4:
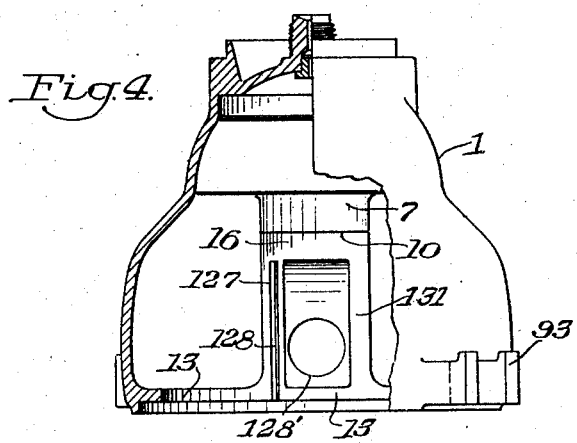
Figure 8:
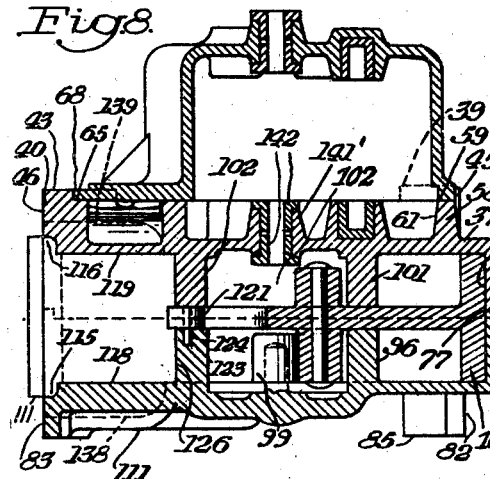
Figure 9:
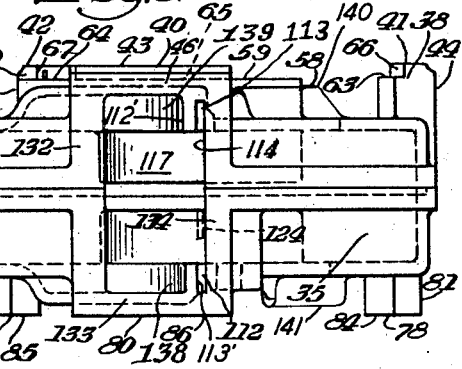
Figure 10:
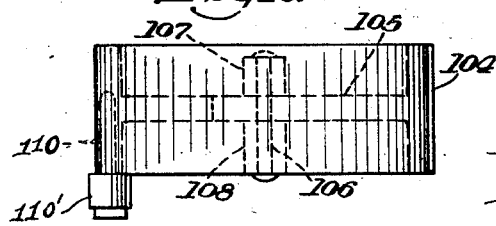
Figure 11:
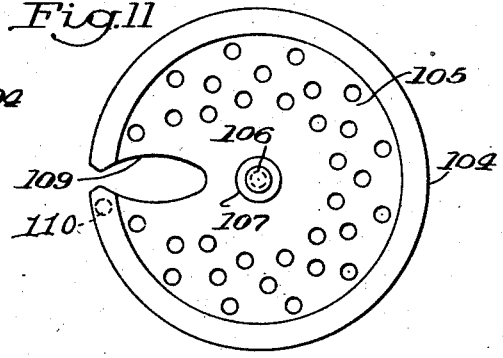
Figure 12:
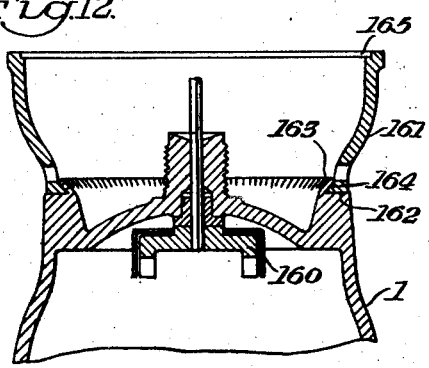
Figure 13:
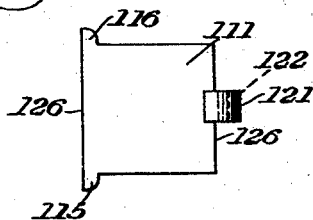

The invention will be described in greater detail in connection with the accompanying drawings, wherein is shown a preferred embodiment of the invention by way of illustration and wherein:

Figure 1 is a vertical sectional view of a preferred embodiment of the invention, Figure 2 is a similar view of the exterior casing, taken on line II—II of Figure 3, Figure 3 is a bottom view of Figure 2, Figure 4 is an end view of Figure 2 looking toward the right with part of the casing in section, Figure 5 is a plan view of the gear case, Figure 6 is a plan view of the measuring chamber, Figure 7 is a plan view of the bottom half of the measuring chamber, Figure 8 is a vertical sectional view of the measuring chamber and assembled gear housing, the gears being removed, Figure 9 is an end view of Figure 8 looking toward the right, Figure 10 is a side elevation of the measuring disk, Figure 11 is a plan view of the measuring disk, Figure 12 is a vertical sectional view of a portion of the outer housing, and Figure 13 is a side elevation of the division plate.

Referring to the drawings (Figures 1 to 4), there is shown the external meter casing or housing 1 having a threaded inlet connection 2 and a threaded outlet connection 3. The interior of the housing has three bosses 5, 6 and 7 which are machined to provide shoulders or stop surfaces 8, 9 and 10 in a common plane. At the bottom of the casing there is provided a flange 12, the inner edge 13 of which is machined on a circle on its interior slightly larger than the circle formed by walls 14, 15 and 16 of bosses 5, 6 and 7.

The measuring chamber 35 (Figures 1, 6, 8 and 9) comprises a lower portion 36 and an upper portion 37, said upper portion having projecting lugs 38, 39 and 40 which are machined on the top surfaces 41, 42 and 43 to engage the shoulders 8, 9 and 10 of bosses 5, 6 and 7. The outer surfaces 44, 45 and 46 of the bosses or lugs 38, 39 and 40 constitute machined ribs which engage the surfaces 14, 15 and 16 of bosses 5, 6 and 7, and thus position the upper portion 37 of the meter chamber in the outer housing 1.

The reduction gear housing or cover 50 (Figure 5) has projecting arms 51, 52 and 53 which are machined at their extremities 54, 55 and 56 on a circle and thus provide flange means on cover 50. The upper surface of the top portion 37 (Figure 6) of the meter chamber has a generally annular rib 58 which is machined on its top surface 59 to provide a seat for the lower machined face 61 of the reduction gear housing 50. The lugs 38, 39 and 40 (Figures 6 and 9) are rabbetted to provide horizontal faces or shoulders 63, 64 and 65 preferably in the same plane as top surface 59, and arcuate vertical surfaces 66, 67 and 68. The extremities of arms 51, 52 and 53 of the gear case are received in the rabbetted portions of lugs 38, 39 and 40 respectively, and the surfaces 66, 67 and 68 engaging ends 54, 55 and 56 position the gear case in the housing. A dowel 69 in the lug 39 co-operating with a hole 71 in arm 52 insures proper positioning of the gear case. The upper surfaces 72, 73 and 74 of arms 51, 52 and 53 are machined flush with the tops of lugs 38, 39 and 40.

The lower portion 36 (Figures 1, 7 and 8) of the meter chamber is rabbetted internally at 76 and receives a rib 77 on the upper portion to position the two sections in assembled relation. The bottom section has lugs 78, 79 and 80 which are machined on a circle on their outer surfaces 81, 82 and 83 to be received by the edge 13 of flange 12, and the ends 84, 85 and 86 of the lugs lie flush with the bottom surface 87 (Figures 1, 2 and 3) of the flange 12 in assembled position. A gasket or washer 88 is located on the surface 87 of flange 12. The suitably lined bottom plate or cover of frangible material, such as cast iron, has a machined surface 89 adapted to engage the washer 88 and bolts 91 passing through the slotted lugs 92 and 93 of the bottom plate and housing respectively releasably clamp the gear case and two meter chamber sections in the housing 1. With this construction, in the event the interior liquid in the meter freezes, one or more of the lugs 92 of the cast iron bottom cover will break off, thus relieving the force holding the gear case and meter chamber sections assembled, and the expansion of the ice will merely force these apart without breakage. By dividing the metering chamber substantially at its middle, the manufacture of the chamber is facilitated.

The lower half of the measuring chamber (Figure 7) of the meter has a cylindrical wall 95 and an inner concentric wall or rib 96 with a well 97 formed within the rib 96 and having at its center a stub or spindle 98. A roller 99 (Figures 1 and 8) preferably is journalled on the shaft 98. The upper half of the measuring chamber similarly has a cylindrical wall 95 (Figures 1 and 8) which in assembled position is a continuation of the wall of the lower chamber, and a concentric wall or rib 101 with a well 102 within the rib. Within the cylindrical wall 95 is located a cylindrical piston 104 (Figure 10) having a middle web 105 which may be perforate and which has a central re-enforcing pin 106 passing through the piston stem 107 and 108 and riveted at its ends. Walls 96 and 101 extend toward each other and terminate short of contact to provide a space therebetween adapted to accommodate piston web 105 as illustrated in Figure 8.

The dividing web of the disk is cut out at 109 in known manner to accommodate a division plate or diaphragm 111 (Figure 13), and a depending headed pin 110 secured in the wall of the piston carries a guide roller 110' cooperating with a slot 111' in the meter chamber. The guide roller and slot eliminate sliding frictional engagement between the piston and division plate and reduce noise in the operation of the meter. This guide roller and slot may be located on either side of the division plate.

The bottom and top walls of the meter chamber are slotted at 112 and 113 (Figures 9, 6 and 7) adjacent the outlet opening 117 to accommodate the tabs 115 and 116 of the division plate, which lies against the machined wall 114 between the bottom wall 118 and top wall 119 of the meter chamber. The slots 112 and 113 preferably are formed between one side wall 114 of outlet opening 117 and bosses 112' and 113', as shown in Figure 9, extending into the outlet opening. It will, therefore, be understood, from reference to Figure 9, that the division plate 111 forms one side wall of the outlet port or opening 117, extending vertically between the bottom wall 118 of the chamber section 36 and the top wall 119 of chamber section 37. At its inner end the plate 111 carries a middle cylindrical portion 121 preferably integrally cast therewith, which is adapted to lie between the machined ribs 96 and 101. This thickened portion 121 has a hole 122 therein, and a pin 123 extending through the hole 122 and into hole 124 in the rib 96 holds the division plate against displacement with its edge 126 in engagement with the vertical outer surfaces of the ribs 96 and 101. Pin 123 may be extended into a similar hole in rib 101.

If desired, a slot 128 may be provided in rib 127 of the outer casing 1 to receive the projecting end of the division plate to brace the same and to insure proper positioning of the meter chamber in the casing.

It will be apparent that by reason of the bosses 5, 6 and 7 extending from the walls of the casing there is provided an annular space between the casing 1 and the measuring chamber 35, which space, however, is sealed off from the outlet passage 128' and outlet opening 117 by the machined surfaces 16, 127, 13 and 131 on the interior of the casing 1 surrounding the outlet passage 128' and engaging complementary sealing surfaces 46, 132, 133 and 134 respectively on the exterior of the measuring chamber 35. Thus, the measuring chamber is substantially entirely surrounded by fluid. The bottom wall 118 and top wall 119 of the measuring chamber have inlet openings 136 and 137 respectively of suitable shape, whereby fluid to be measured may enter the measuring chamber. The inlets 136 and 137 are shielded by shields 140 and 141 partially closing the inlets and which may be cast integral with the meter chamber, and serve to prevent lateral currents acting on the disk. Upraised shields 140 and 141 are closed on the incoming fluid side and extend above and partially over the two inlet ports in such manner as to prevent incoming fluid flow currents from directly impacting piston 104. This results in an improvement in accuracy, particularly at high rates of flow. The bottom portion of the measuring chamber has an outlet recess or depression 138 and there is a similar outlet recess or depression 139 in the top wall which depressions merge at the outlet opening 117 to provide a combined outlet for fluid from the measuring chamber. The upper shell of the measuring chamber has a boss 141' within the area defined by rib 58 which receives bushings 142 of hard rubber, graphite, or other suitable material and has a shaft 143 extending therethrough with a driven dog 144 in the central well 102. A pinion 145 is suitably secured to the opposite end of shaft 143, for example, by a pressed fit. The upper shell also has bosses 146, 147 and 148 in which are located hard rubber bushings and in which are journalled one end of the shafts of suitable reduction gears, indicated generally by the numeral 149. The top wall 151 of the gear housing 50 has similar internal bosses 152 for journalling the opposite ends of the reduction gear shafts. In the central boss 155 is journalled a spindle 156 having the final gear 157 on the inner end thereof, and a driving crank or dog 158 on the outer end which engages the register drive dog 160. Cover or housing 50 is packed with a suitable grease upon assembly.

The lower portion 161 (Figure 12) of the register case is received on the shoulder 162 of the casing 1 and the flange 163 is spun over on the sloping flange 164 of the register case to hold it assembled. A shoulder 165 receives the bottom plate of the register and the top portion 166 provided with a suitable lid is secured to the bottom portion by screws passing through suitably apertured lugs in the top and bottom portions.

What I claim as my invention and desire to secure by Letters Patent is:

1. In an oscillating piston meter, a measuring chamber providing top and bottom walls and a cylindrical wall with a substantially radial outlet opening therethrough, a metering element in said chamber, outlet depressions in the top and bottom walls of said measuring chamber merging into said radial opening, an outer casing, means locating said meter chamber within the outer casing in spaced relation thereto to provide an annular inlet chamber, an inlet connection in the outer casing communicating with said annular chamber, inlet openings in the top and bottom walls of said measuring chamber, co-operating means on the outer casing and measuring chamber sealing the radial opening from said annular inlet chamber, and an outlet connection in the outer casing communicating directly with said radial opening.

2. In an oscillating piston meter, an outer housing open at the bottom and closed at the top, a register driving spindle journalled in said top, a measuring chamber, a gear case loosely assembled to said measuring chamber and positioned thereby, reduction gearing in said gear case journalled in the top wall thereof and in the top wall of the measuring chamber, means extending through the gear casing to drive said register spindle, projecting stops in said outer housing serving as abutments for the gear case and measuring chamber, and a bottom cover for said housing releasably holding said gear case and measuring chamber in position.

3. In an oscillating piston meter, a measuring chamber having an inlet port and an outlet port comprising two half sections to provide a cylindrical measuring chamber having an intermediate cylindrical wall in each half section, a separate and removable division plate extending from the outer wall of said chamber to the intermediate walls and having at its inner end an enlarged portion received between said intermediate walls, a part on the outer end of said plate seated in a slot in said outer wall and positioning said division plate to form one wall of the outlet port, a pin extending into said enlarged portion and into at least one section of said intermediate walls, and a cylindrical piston having a dividing membrane therein received between said intermediate walls, said piston and membrane being cut away to accommodate said division plate.

4. In an oscillating piston meter, an outer housing, a cylindrical measuring chamber in said housing and having an outlet opening therein and having an intermediate cylindrical wall, a separate division plate extending from the intermediate wall through said opening and constituting one wall of the outlet opening therein, means extending into said opening to provide a slot accommodating the division plate, a slot in the outer housing to accommodate the projecting end of said division plate, and means to secure said division plate to said intermediate wall.

5. In an oscillating piston meter, a generally cylindrical measuring chamber having top and bottom walls, a cylindrical outer wall having a substantially radial opening therethrough, and an intermediate cylindrical wall, a metering element in said chamber, a division plate extending from the intermediate wall through said radial opening to form one wall thereof, inlet openings in the top and bottom walls of the measuring chamber on one side of said division plate, depressions in the top and bottom walls on the opposite side of said division plate merging into the radial opening in the measuring chamber, an outer casing, means locating said meter chamber within the outer casing in spaced relation thereto to provide an annular inlet chamber communicating with the inlet openings, an inlet connection in the outer casing communicating with said annular chamber, cooperating sealing surfaces on the outer casing and measuring chamber sealing the radial opening from said annular inlet chamber, and an outlet connection in the outer casing communicating with said radial opening.

6. In an oscillating piston meter, a measuring chamber providing top and bottom walls and a cylindrical wall with a substantially radial opening therethrough surrounded by smooth integral sealing surfaces on said cylindrical wall, a metering element in said chamber, outlet depressions in the top and bottom walls of said measuring chamber merging into said radial opening, inlet openings in the top and bottom walls of said measuring chamber, an outer casing having an outlet connection surrounded by smooth integral sealing surfaces, cooperating projecting means on the outer casing and measuring chamber locating said measuring chamber within the outer casing in spaced relation thereto and in sealing engagement adjacent the outlet opening, and providing an annular inlet chamber, and an inlet connection in the outer casing communicating with said annular chamber.

7. In an oscillating piston meter, an outer housing open at the bottom and closed at the top, a measuring chamber having lugs thereon, a gear case adapted to be loosely assembled to said measuring chamber and having arms positioned by said lugs, reduction gearing in said case journalled in the top wall of said measuring chamber and of said gear case, projecting stops in said outer housing serving as abutments for the gear case and measuring chamber lugs, means centering said gear case and measuring chamber in spaced relation to the housing, and a bottom cover for said housing releasably retaining said gear case and measuring chamber in operative position.

8. In an oscillating piston meter, a casing, a measuring chamber in said casing providing top and bottom walls and a cylindrical wall with a substantially radial outlet opening therethrough, intermediate cylindrical walls extending from the top and bottom walls, said top and bottom walls being formed with fluid inlet openings, outlet depressions in the top and bottom walls of said measuring chamber merging into said radial opening, a cylindrical piston having a dividing membrane received between said intermediate walls, and shield means disposed in the path of incoming fluid flow and extending partly over said inlet openings for preventing direct impact on said piston of fluid entering said casing.

9. In an oscillating piston meter, an outer housing open at the bottom and closed at the top, a register driving spindle journalled in said top, a measuring chamber comprising two separable half sections to provide a cylindrical measuring chamber having an intermediate cylindrical wall in each half section, a gear case loosely assembled to said measuring chamber and positioned thereby, reduction gearing in said gear case journalled in the top wall thereof and in the top wall of the measuring chamber, means extending through the gear case to releasably engage and drive said register spindle, projecting stops in said outer housing serving as abutments for the gear case and measuring chamber, a bottom cover for said housing engaging said measuring chamber, and frangible means securing said cover to said housing.

10. In an oscillating piston meter, an outer housing open at the bottom and closed at the top, a register driving spindle journalled in said top, a measuring chamber comprising two separable half sections to provide a cylindrical measuring chamber having an intermediate cylindrical wall in each half section, said housing and chamber providing cooperative seating surfaces in sliding contact to center said measuring chamber, a separate division plate releasably engaging said half sections and extending from the outer wall to the intermediate walls and having an enlarged portion received between said intermediate walls, a gear case loosely assembled to said measuring chamber and positioned thereby, reduction gearing in said gear case journalled in the top wall thereof and in the top wall of the measuring chamber, means extending through the gear case to releasably engage and drive said register spindle, projecting stops in said outer housing serving as abutments for the gear case and measuring chamber, a bottom cover for said housing engaging said measuring chamber, and frangible means securing said cover to said housing.

11. In an oscillating piston meter, a measuring chamber providing top and bottom walls and a cylindrical wall with a substantially radial opening therethrough, intermediate cylindrical walls extending from the top and bottom walls, outlet depressions in the top and bottom walls of said measuring chamber merging into said radial opening, said chamber having inlet openings in the top and bottom walls thereof, protective shield means extending over said inlet openings in the path of incoming fluid flow, and a cylindrical piston received between said intermediate walls, said shield means preventing lateral currents in the incoming fluid from impacting directly on said piston.

12. In an oscillating piston meter, an outer housing open at the bottom and providing internal shoulders, a measuring chamber in abutting relation to said shoulders, a gear case adapted to be loosely assembled to said measuring chamber, flange means on said case interposed between the measuring chamber and said shoulders, reduction gearing in said case journalled in said measuring chamber and gear case, means for centering said gear case and measuring chamber in said housing, and a bottom cover for said housing releasably retaining said gear case and measuring chamber in operative position.

13. In an oscillating piston meter, a meter casing having fluid inlet and outlet connections, means for mounting a register on one end of said casing, the other end of the casing being formed with an aperture, means providing internal seat means within said casing facing said aperture, a measuring chamber housing within said casing having fluid connection with said inlet and outlet connections, means for mounting register drive mechanism upon the end wall of said housing opposite said aperture and outside said chamber, a cover for said drive mechanism seated on said housing, seating means on said housing and cover adapted to fit with said internal seat means on the meter casing, and a removable cover for said aperture formed to hold said housing and register drive mechanism cover against said internal seat means.

14. In the meter defined in claim 13, cooperating peripheral seating means within said meter casing and on said housing for positioning said register drive mechanism in proper alignment to drive said register.

15. In an oscillating piston meter, a housing defining a measuring chamber, external bearing seats on the upper wall of said housing, a register drive gear train having substantially vertical shafts mounted on said bearing seats and including a drive spindle projecting within said chamber, a cover for said gear train provided with bearings for said shafts, and cooperating seating and positioning means on said cover and the upper wall of said chamber for properly locating said cover, said gear train being held in operative assembly by said proper positioning of said cover.

16. In an oscillating piston meter, a meter casing having fluid inlet and outlet connections, a housing within said casing defining a measuring chamber, said casing having an inlet fluid receiving space extending partly about said measuring chamber, a relatively light piston oscillatable within said chamber, an inlet opening through an end wall of said housing providing for ingress of fluid directly from said space into said chamber to actuate said piston, and shield means on said wall partially extending over said inlet opening for preventing direct impact of inlet fluid current flow on said piston.

17. The meter defined in claim 16, wherein said shield means comprises an integral extension of said housing at said inlet opening presenting a closed side facing said inlet fluid flow.

ALEXANDER R. WHITTAKER.